(12) United States Patent
France et al.

(10) Patent No.: US 6,244,566 B1
(45) Date of Patent: *Jun. 12, 2001

(54) VALVE ASSEMBLY

(75) Inventors: Richard M. France, Jackson; Russell L. Rogers, Munith, both of MI (US)

(73) Assignee: Aeroquip Corporation, Maumee, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,573

(22) Filed: Jul. 9, 1999

(51) Int. Cl.[7] ................................. F16K 31/524
(52) U.S. Cl. .................. 251/263; 251/257; 251/325; 251/340
(58) Field of Search ................ 257/149.4, 148, 257/152, 214, 215, 226, 227, 251, 252, 229, 253, 256, 257, 262, 263, 325, 335.2, 340

(56) References Cited

U.S. PATENT DOCUMENTS

| | | | |
|---|---|---|---|
| 2,690,917 | * | 10/1954 | Chandler ........................ 251/149.4 |
| 2,715,512 | * | 8/1955 | Miller et al. .................... 251/148 |
| 3,516,639 | * | 6/1970 | Himmelman .................... 251/257 |
| 4,477,054 | * | 10/1984 | Danby et al. ................. 251/252 X |
| 4,667,931 | * | 5/1987 | Egert et al. .................. 251/263 X |
| 5,368,058 | * | 11/1994 | Gold et al. ................... 251/148 X |
| 5,551,477 | * | 9/1996 | Kanno et al. ................. 251/263 X |
| 5,727,773 | * | 3/1998 | Dunnigan ....................... 251/325 |
| 6,047,949 | * | 4/2000 | Beauchemin, Jr. ............ 251/257 |

* cited by examiner

Primary Examiner—Kevin Shaver
Assistant Examiner—Eric Keasel
(74) Attorney, Agent, or Firm—Emch, Schaffer, Schaub & Porcello, Co., L.P.A.

(57) ABSTRACT

A valve assembly includes a poppet axially moveable in a passageway of a body member. The poppet has an annular seal sealingly engageable with a sealing abutment of the body and, when so engaged, blocks the flow of fluid between the first end of the body and the second end of the body. A rotatable actuator imparts axial movement to the poppet to move the annular seal from the positioned engaged to the shoulder to a positioned spaced from the shoulder.

19 Claims, 8 Drawing Sheets

VALVE ASSEMBLY

The present invention relates to a valve assembly which can be used for controlling the flow of either gases or liquids. When used for controlling the flow of gases, it can function as a dry break valve for sealing inlet and outlet ports of a mass flow controller or similar device. When used for liquids, it can be part of a hydraulic fluid flow system.

BACKGROUND OF THE INVENTION

With respect to its use as a dry break valve, semiconductor manufacturing involves building up layers of conducting and insulating films on silicon wafers to produce miniature transistors. These films are deposited or etched using reactive gases, liquified gases or liquids. It is imperative to get precise properties of the films and to get repeatability from wafer to wafer. One of the requirements for achieving precision is to deliver exactly the flow rate of gas called for by the process and at exactly the required pressure and temperature. This is achieved by using several reactant delivery components. These are arranged into a "gas box" (sometimes called a "gas panel" or a "gas jungle" or a "gas tray"). A gas box contains an assembly of "gas sticks," each of which monitors and controls the flow of one gas to the process chamber. A gas stick is built around a component called a mass flow controller. The mass flow controller controls the flow rate of gas (or in some instances liquid). It is a thermal based device that reads the flow rate based on the temperature rise of the gas as it passes through the device. The temperature rise is calibrated to flow for the particular gas.

At the completion of the construction of the mass flow controller, the manufacturer may purge the mass flow controller with a gas such as dry argon. At the completion of the purged cycle, it is desired that the purge gas (i.e., dry argon for example) be maintained in the mass flow controller under a pressure on the order of 2 psig during shipment of the mass flow controller to the customer.

SUMMARY OF THE PRESENT INVENTION

The valve assembly of the present invention is self-sealing. It has one end designed to mate with a standard VCR assembly such as that manufactured and sold by Cajon Company, Macedonia, Ohio to achieve a metal-to-metal seal which is desirable for high purity assemblies requiring vacuum or a positive pressure. See for example, U.S. Pat. No. 5,605,358.

The dry break assembly valve of the present invention has its own internal valving which permits the introduction of the purging gas such as dry argon into the mass flow controller. Following introduction of such purging gas in a quantity sufficient to provide a build-up of pressure, for example on the order of 2 psig, the internal valving of the dry break assembly may be closed thereby retaining such purging gas within the mass flow controller. The dry break assembly of the present invention may then be shipped with the mass flow controller and remain with it during shipping and storage until its installation in a gas stack. By maintaining a positive pressure on the purge gas within the mass flow controller assembly, it is assured that contaminants cannot enter the mass flow controller.

DETAILED DESCRIPTION OF THE INVENTION

Referring to the drawings, there is shown a valve assembly 10 having a body 20 extending along an axis A from a first end 21 to a second end 22. A circumferential sealing bead 23 is provided at the first end 21. The sealing bead 23 is intended to achieve a metal-to-metal seal such as that shown for example in U.S. Pat. No. 5,605,358. Externally, the body is provided with first outwardly facing threads 24 in the vicinity of the first end 21 and second outwardly facing threads 25 adjacent the second end 22.

Adjacent the second outwardly facing threads 25 is a recessed cylindrical wall portion 26 followed by an enlarged base 27 having a generally hexagonal cross-section defined by a series of flat faces 27A, 27B, 27C, 27D and 27E which are shown and another face which is not visible in the drawings. A radial shoulder 28 extending outwardly from the cylindrical wall 26 defines the end of the enlarge base 27 facing the second end 22. The opposing end of the enlarge base 27 facing the first end 21 is provided with a cylindrical recess or groove 30. The groove 30 is defined by an outer cylindrical wall 30A and an inner cylindrical wall 30B and a bottom 30C. A radial shoulder 31 extends inwardly from the cylindrical wall 30B and joins with an annular groove 32 adjacent the first threads 24. Extending inwardly from the cylindrical wall 30B is an outwardly facing groove 33 which is spaced axially a short distance from the radial shoulder 31.

Internally the body 20 has an inwardly facing cylindrical wall 34 adjacent the first end 21 defining an inlet. Extending radial outwardly from the cylindrical wall 34 is an annular valve seat 35 from which extends in a generally axial direction but tapering outwardly a conical wall section 36. A radial shoulder 37 extends outwardly from the conical wall section 36 to a cylindrical step 38 extending to a radially extending seat 39. A second cylindrical step 40 extends to a second radially extending seat 41. An inwardly facing cylindrical wall section 42 extends in an axial direction from the second radially extending seat 41 to an outwardly extending diaphragm seat 43. A third inwardly facing cylindrical wall section 44 extends from the diaphragm seat 43 to the second end 22.

An inwardly facing annular groove 46 extends outwardly from the second inwardly facing cylindrical wall 42. A plurality of ball receiving apertures 48, preferably three in number, extend through the wall member defined by the outwardly facing cylindrical wall surface 30B and the second inwardly facing cylindrical wall 42. Preferably the ball receiving apertures 48 extend through the wall section at an angle of 450 relative to the axis A and taper outwardly in a direction toward the first end 21.

Figure 1:
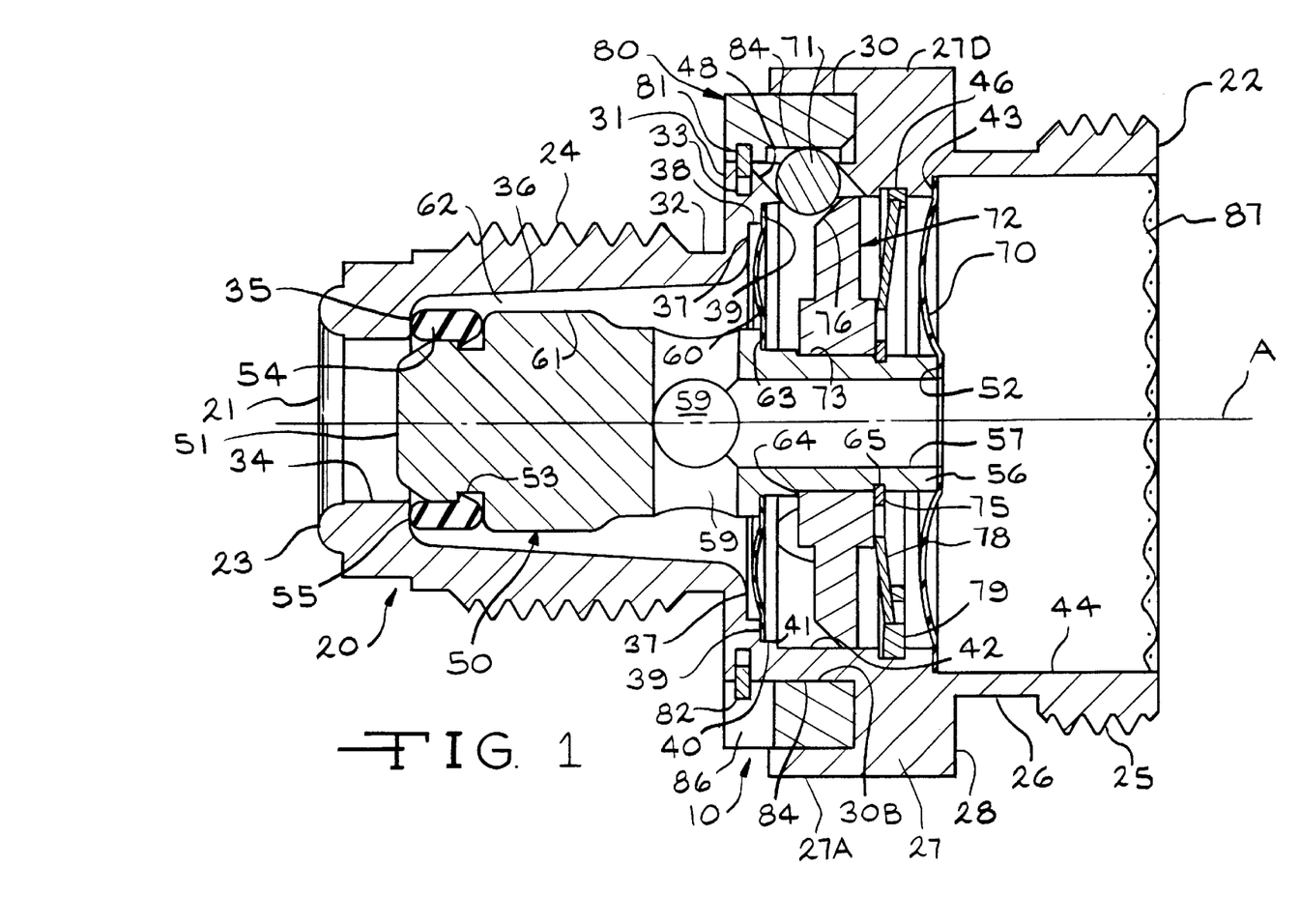
FIG. 1 is a sectional view in elevation of one embodiment of the valve assembly of the present invention in the closed position.
Figure 2:
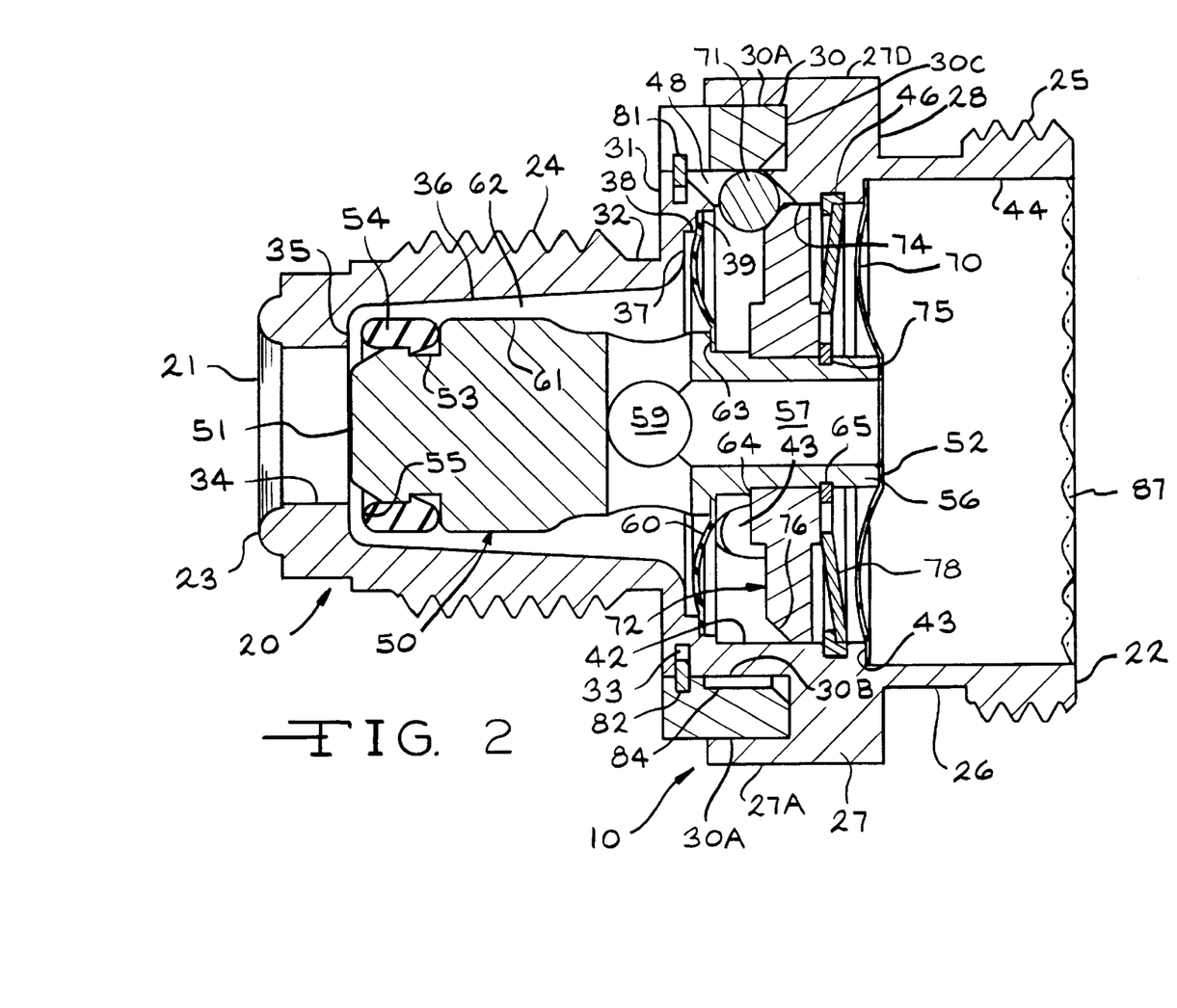
FIG. 2 is a view similar to FIG. 1 showing the valve assembly in the open position.
Figure 3:
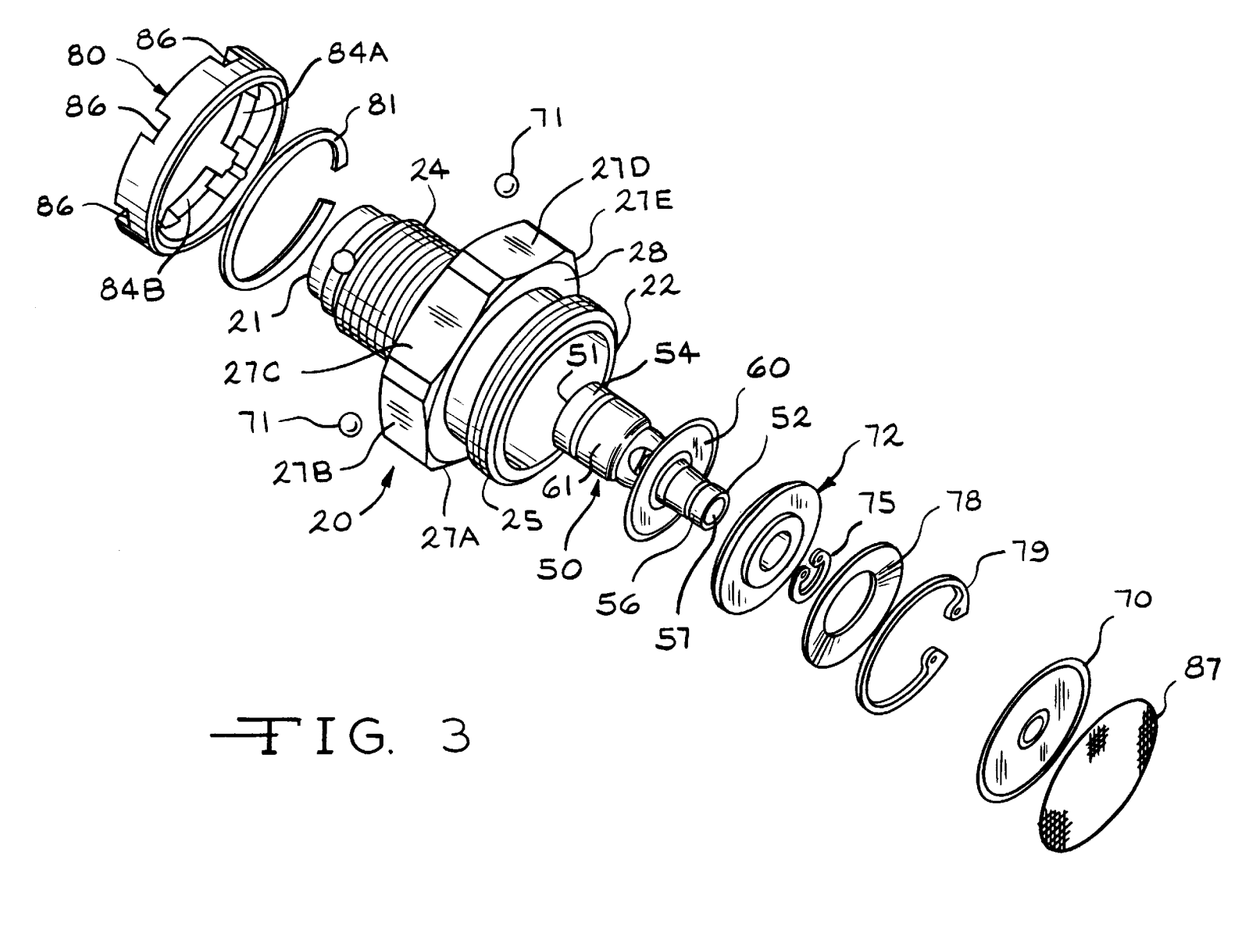
FIG. 3 is an exploded view in perspective of the valve assembly.

Positioned within the body 20 is a poppet 50 which extends axially from a first sealing end 51 to a second open end 52. The portion of the poppet adjacent the sealing end is provided with a retention groove 53 in which is positioned an annular seal 54 which extends axially to a sealing end 55 positioned for sealing engagement with the radial valve seat 35 when the poppet 50 is in the closed position shown in FIG. 1. The poppet 50 has a stem 56 with an axial passageway 57 extending to the second open end 52. The axial passageway 57 extends to a juncture with a plurality of radially extending passageways 59. The portion of the poppet between the first end 51 and the passageways 59 is solid and includes an annular wall 61. The outer portion of the annular seal 54 and the annular wall 61 are both spaced from the conical wall section 36 of the body 20 and cooperate therewith to define an annular passageway 62 communicating with the passageways 59 and the passageway 57 to permit the flow of fluid through the body 20 when the poppet 50 is in the open position as shown in FIG. 2.

Externally, the stem 56 is provided with a first radially extending shoulder 63 and a second, radially smaller shoulder 64 between the shoulder 63 and the second open end 52. The stem 56 is also provided with an outwardly facing annular groove 65 in the area between the smaller shoulder 64 and the second open end 52.

The poppet 50 is retained in the body 20 by means of an inner diaphragm 60 and an outer diaphragm 70. The inner diaphragm 60 has an outer circumferential edge which is welded to the radially extending seat 39 of the body 20 and an inner circumferential edge which is welded to the radially extending shoulder 63 of the poppet stem.

The outer diaphragm 70 has an outer circumferential edge welded to the diaphragm seat 43 of the body 20 and an inner circumferential edge welded to the second open end 52 of the poppet 50. The inner circumferential edge of the outer diaphragm 70 defines an opening through which fluid passing through the passageway 57 may pass. The inner diaphragm 60 and outer diaphragm 70 may be formed of a high nickel bearing alloy such as one marketed under the trademark Elgiloy® which provides good resistance to stress cracking as a result of axial movement of the respective inner circumferential edges of the diaphragms relative to their outer circumferential edges upon axial movement of the poppet 50 in the body 20 as hereinafter described.

Positioned in each of the apertures 48 is a spherical ball 71. Also, positioned in the body 20 is a thrust washer 72 having an inner cylindrical wall 73 encircling the stem 56 of the poppet and an outer cylindrical wall 74 slideably engaged to the second inwardly facing cylindrical wall 42 of the body. The thrust washer 72 is retained in a fixed position on the stem 56 by means of (1) a snap ring 75 positioned in the outwardly facing annular groove 65 engaging the outer surface of the thrust washer 72 and (2) the inner surface of the thrust washer 72 engaging the small radially extending shoulder 64.

The thrust washer 72 is provided with a tapered camming surface 76 which tapers inwardly toward the axis A and toward the first end 21 of the body 20. As may be seen in comparing FIGS. 1 and 2, movement of the balls 71 radially inwardly causes them to slide along the tapered camming surface 76 to urge the poppet 50 from the closed position shown in FIG. 1 at which the sealing end 55 of the annular seal 54 is sealingly engaged to the valve seat 35 of the body 20 to a position to the right as shown in FIG. 2 at which the sealing end 55 is spaced from the valve seat 35 thereby opening the valve assembly 10 to permit the flow of fluid into the first end 21 through the opening defined by the cylindrical wall 34 and into the annular passageway 62, through the passageways 59, the stem passageway 57 and out of the outlet end 22. Upon movement of the balls 71 radially outwardly, the thrust washer 72 and poppet 50 may return to the sealed position shown in FIG. 1. A Belleville spring 78 is provided to urge the thrust washer 72 and poppet 50 to the sealed positioned of FIG. 1. A snap ring 79 is retained in the inwardly facing annular groove 46 of the body and engages the outer edge of the Belleville spring 78. The inner edge of the Belleville spring 78 is in contact with the outer surface of the thrust washer 72.

Figure 4:
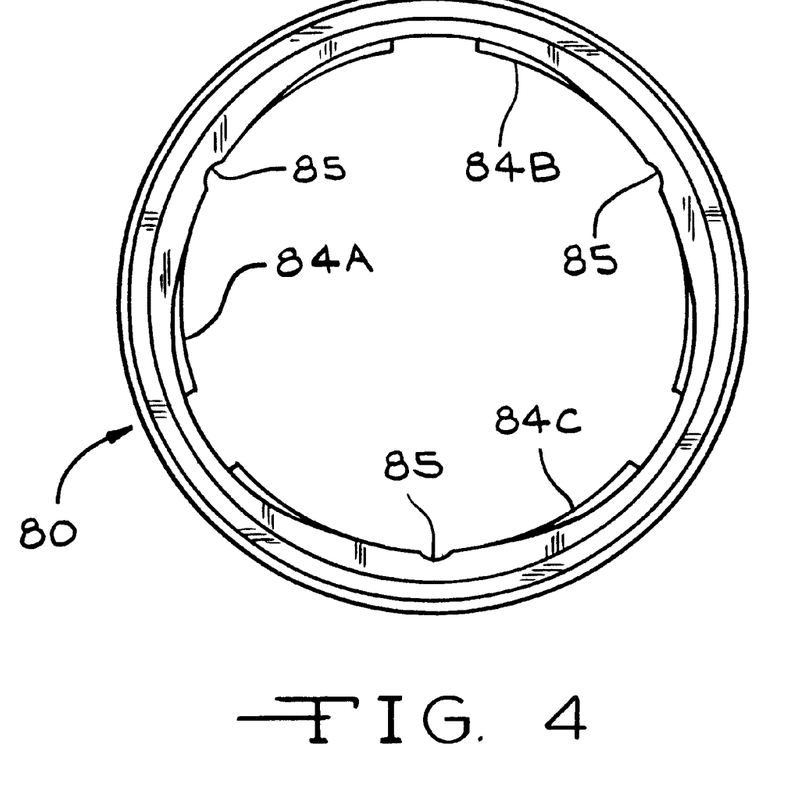
FIG. 4 is a plan view of the actuator element of the valve assembly of the present invention.

In order to move the balls from an outer position to a radially inner position, there is provided an actuator 80 which is positioned in the annular recess 30 of the body 20. The actuator 80 is rotatably retained in the annular recess 30 by means of a snap ring 81 positioned in and extending outwardly from the outwardly facing annular groove 33 of the body and into an aligned inwardly facing annular groove 82 of the actuator 80. The outer surface of the actuator 80 is cylindrical. The actuator 80 is rotatably moveable in the outer portion of the annular recess 30. As may be seen in FIGS. 1 and 2 and in greater detail in FIG. 4, the inwardly facing surface 84 of the actuator 80 is contoured to provide three sets of camming surfaces 84A, 84B and 84C. Each of the camming surfaces 84A, 84B and 84C is engageable by and controls the radially inward and outward movement of one of the balls 71 upon rotation of the actuator 80. Centrally positioned at the radially outermost portion of each of the inwardly facing camming surfaces 84A, 84B and 84C is a detent 85 extending outwardly a slight amount from adjacent portions. Upon rotation of the actuator 80 to a position at which the balls 71 engage the respective detents 85, there will be a slight clicking sound which will provide an indication to the operator that the balls 71 are at their maximum outward position and that the poppet is in its sealed position with the sealing end 55 of the annular seal 54 sealingly engaged to the valve seat 35 as shown in FIG. 1.

The end of the actuator 80 facing the first end 21 of the body 20 is provided with a series of recesses 86, preferably six in number, which may be engaged by a spanner wrench in order to effect rotation of the actuator 80.

If the valve assembly 10 is to be used with a mass flow controller or other apparatus requiring high purity, it will be desirable to have a filter 87 secured to the second outlet end 22 of the body.

In operation, the valve assembly 10 may have its second end 22 threadably engaged to a threaded port of a mass flow controller or other unit into which fluid is to be directed. A source of fluid may be threadably engaged to the threads 24 at the first inlet end 21 of the body 20. When it is desired to introduce fluid through the valve assembly 10, a spanner wrench may engage the recesses 86 of the actuator 80 and rotate the actuator 80 from a position at which the detents 85 are aligned with the balls 71 to a position approximately 60° therefrom, at which position the balls 71 will engage the radially inner most portions of the respective camming surfaces 84A, 84B and 84C. Upon such rotation of such actuator, the camming surfaces 84A, 84B and 84C will urge the balls 71 radially inwardly thereby causing the balls 71 to move against the tapered camming surface 76 of the thrust washer 72 urging such thrust washer 72 and the poppet 50 carried thereby to the right to the open position of FIG. 2.

When it is desired to close the valve assembly 10, the actuator 80 will be rotated to the position at which the detents 85 are aligned with the balls 71 thereby permitting the balls 71 to move to their outermost positions. With the balls so positioned, the Belleville spring 78 urges the thrust washer 72 and the poppet 50 toward the first end 21 causing the sealing end 55 of the annular seal 54 to sealingly engage the valve seat 35 closing the valve assembly 10.

Figure 5:
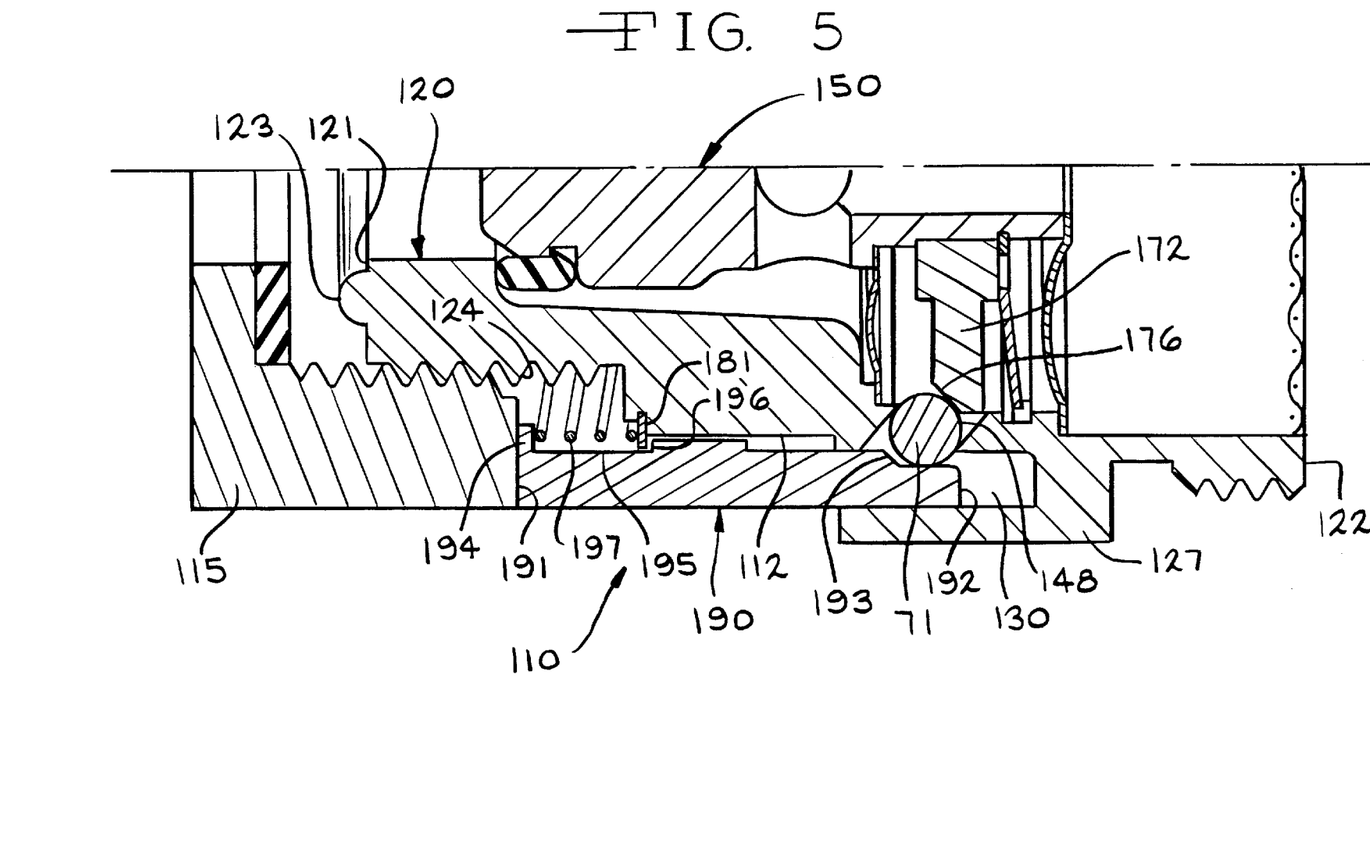
FIG. 5 is a sectional view in elevation of a second embodiment of the present invention showing the valve assembly in the closed position.
Figure 6:
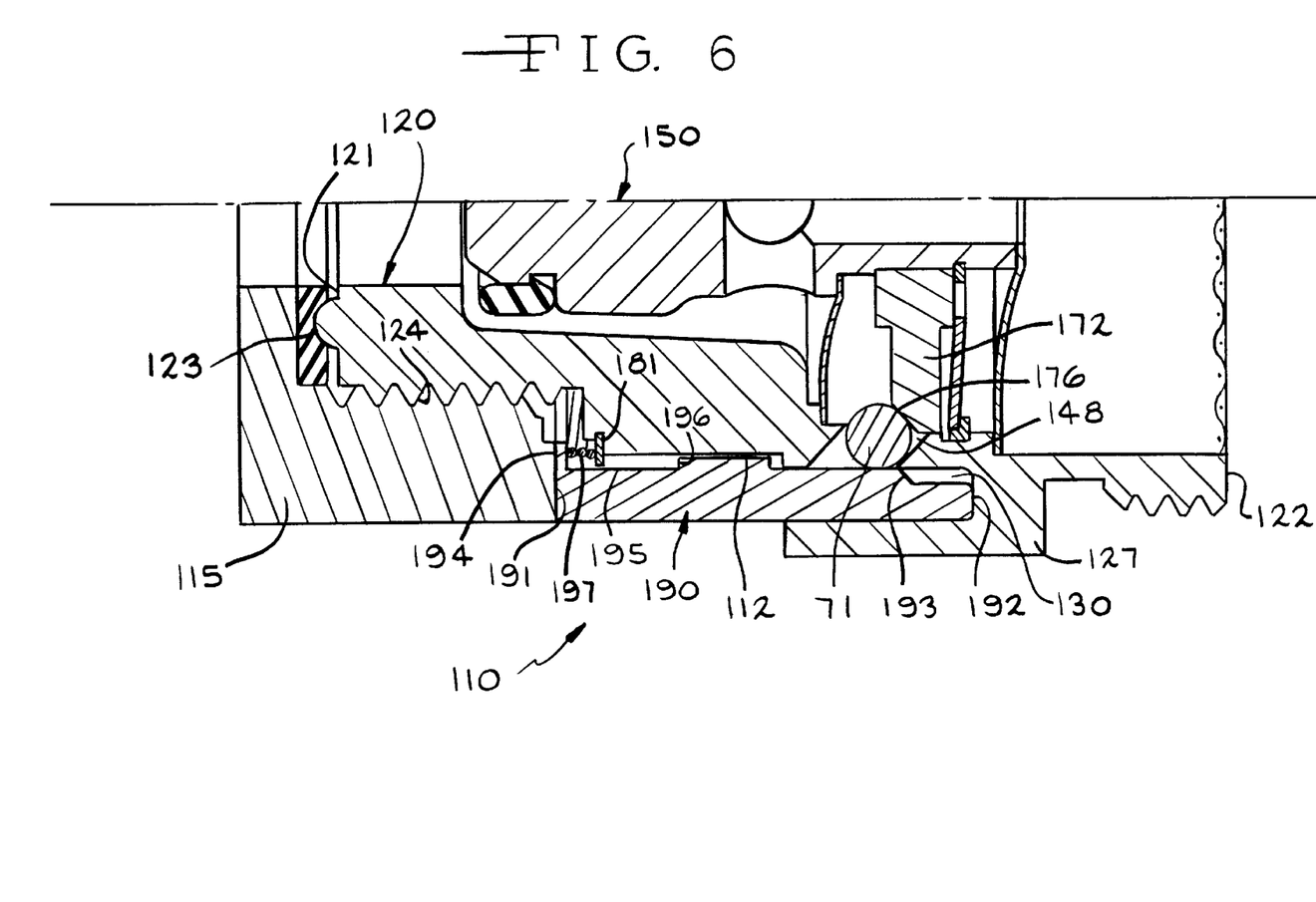
FIG. 6 is a view similar to FIG. 5 showing the valve assembly in the open position.

Referring now to FIGS. 5 and 6, there is shown another embodiment of valve assembly generally designed by the numeral 110. This valve assembly 110 may be actuated and moved from the closed to open position by rotatable engagement of a nut on the body thereby causing axial movement of an actuator ring. Similar to the embodiment of FIGS. 1 through 4, this embodiment utilizes a series of balls being urged radially inwardly to effect movement of the poppet from a sealed closed position to an open position.

The valve assembly 110 of the embodiment of FIGS. 5 and 6 utilizes a body 120 and poppet 150 which are similar to the body 20 and poppet 50 of the embodiment of FIGS. 1 through 4. Accordingly, only those features which are different will be described in detail. The numbering of members of this embodiment will follow a similar sequence as the corresponding portions of the embodiment of FIGS. 1 through 4 except that the numbers will be in the 100 series.

As shown in FIGS. 5 and 6 there is provided a body 120 extending from a first inlet end 121 to a second outlet end 122. The body has a sealing bead 123 at the inlet end and outwardly facing threads 124 adjacent thereto.

In the embodiments of FIGS. 5 and 6, there is provided an outer sleeve 190 which is axially moveable in the recess 130 of the body 120. The enlarged base 127 of the body 120 has been lengthened axially from the base 27 shown in the embodiment of FIGS. 1 through 4 in order to provide a deeper recess 130 in which the end of the outer sleeve 190 may slide.

The outer sleeve 190 extends from a first end 191 to a second end 192. Spaced from the second end 192 is an inwardly tapering camming surface 193 which is positioned to contact the balls 71 when the portion of the outer sleeve 190 between the second end 192 and the camming surface is moved axially within the recess 130 toward the second end 122 of the body 120.

The outer sleeve 190 also is provided with a radially inwardly extending first shoulder 194 at the first end 191 extending radially inwardly from its inner surface 195 and a second shoulder 196 spaced therefrom and also extending radially inwardly from the inner surface 195.

The body 120 is slightly longer than the body 20 of the embodiments of FIGS. 1 and 2 and is provided with an outwardly facing cylindrical wall surface 112 axially positioned between the threads 124 and the apertures 148 in which the balls 71 are retained. A snap ring 181 is positioned in an outwardly facing annular groove extending inwardly from the cylindrical wall surface 112. A compression spring 197 is positioned between the shoulder 194 and the snap ring 181 and urges the outer sleeve 190 in a direction toward the first end 121 such that the camming surface 15 is out of engagement with the balls 71. Engagement of the second shoulder 196 with the snap ring 181 prevents the outer sleeve 190 from being pushed completely out of the recess 130.

A nut 115 is engaged to the threads 124. Rotation of the nut 115 on the threads 124 to move the nut 124 toward the second end 122 moves the outer sleeve 190 against the urging action of the spring 197 to a position where its camming surface 193 engages the balls 171 forcing them radially inwardly to contact the tapered camming surface 176 of the thrust washer 172 to move the poppet 150 from the closed position of FIG. 5 to the open position of FIG. 6.

Figure 7:
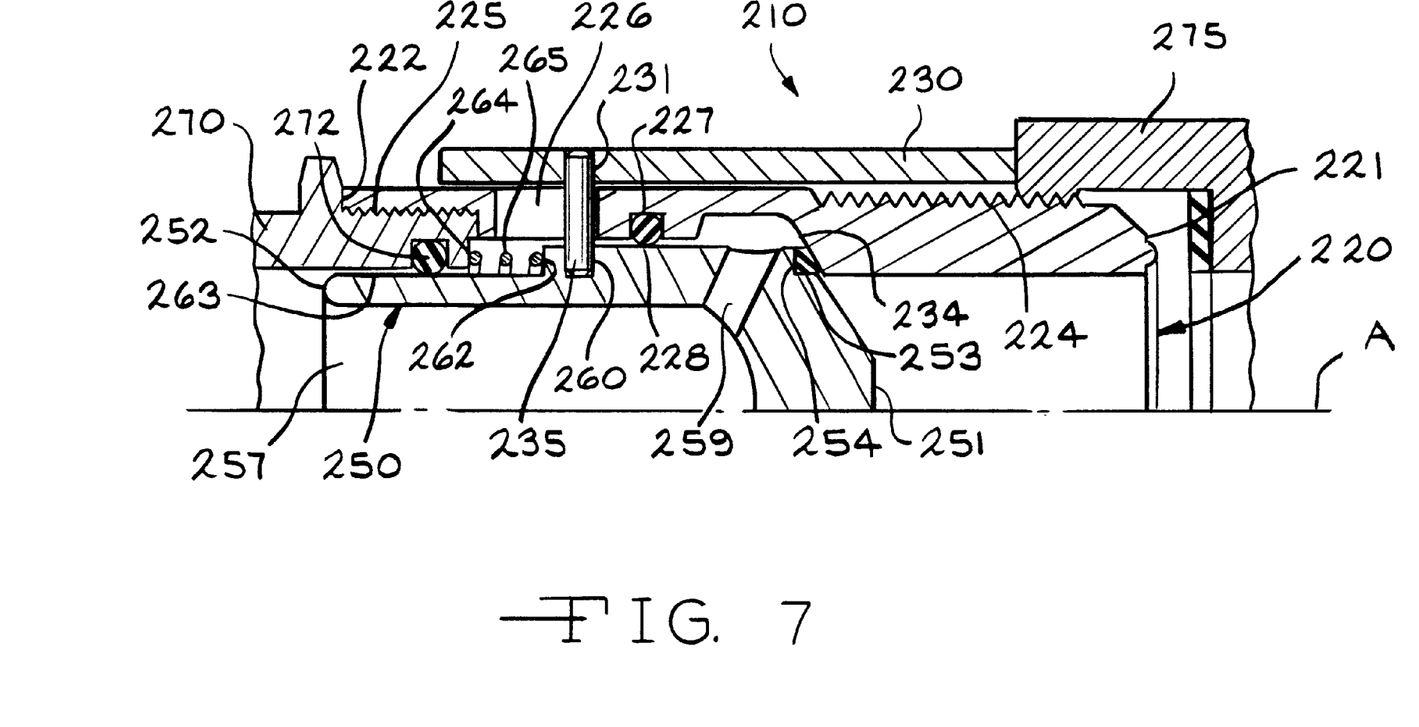
FIG. 7. is a sectional view in elevation of a third embodiment of the present invention showing the valve assembly in the closed position.
Figure 8:
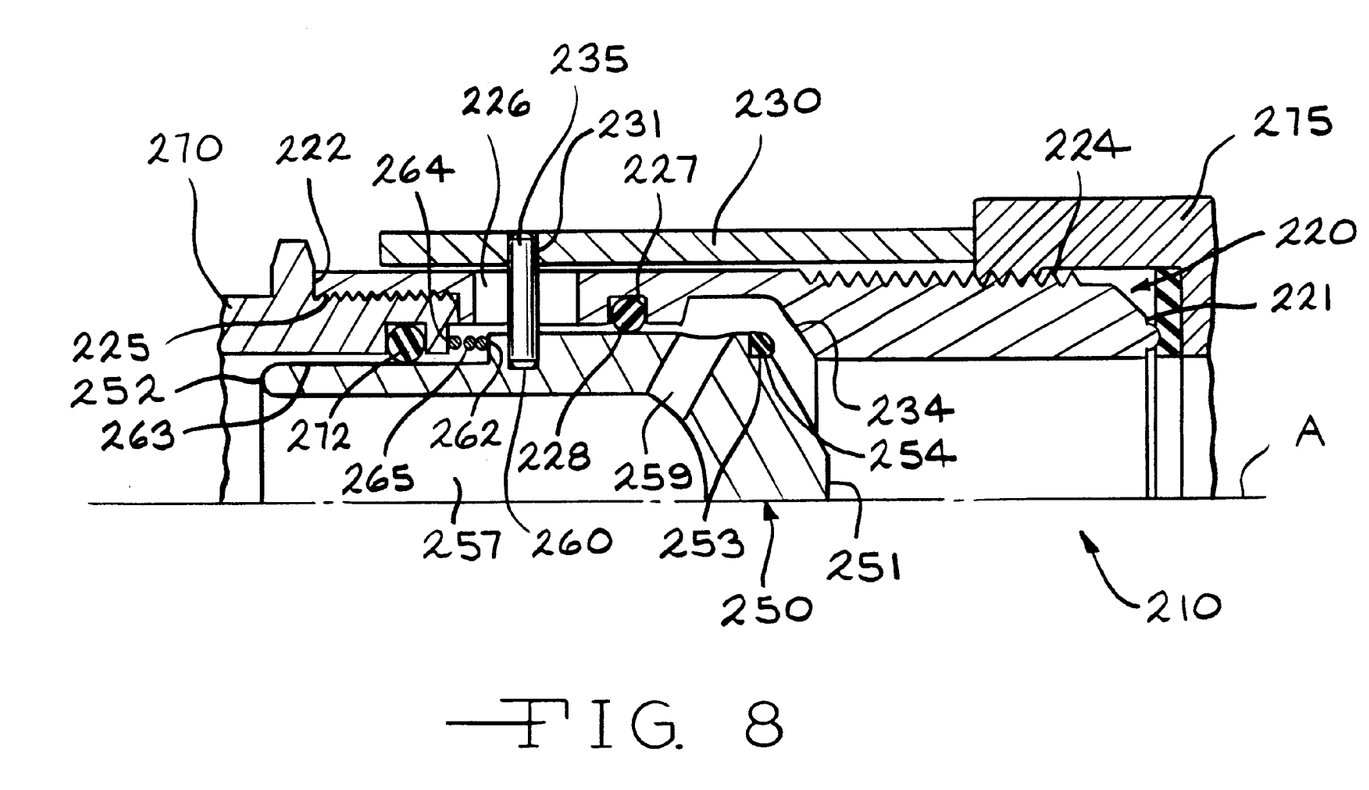
FIG. 8 is a view similar to FIG. 7 showing the valve assembly in the open position.

Referring to FIGS. 7 and 8, there is provided a further embodiment of valve assembly 210 which, similar to the embodiment of FIGS. 5 and 6 may be moved from a closed to open position by simple rotation of a nut to cause axial movement of a sleeve which in turn causes axial movement of the poppet. There is provided a body 220 extending along an axis A from a first end 221 to a second end 222. The body 220 has outwardly facing threads 224 adjacent the first end 221 and inwardly facing threads 225 adjacent the second end 222. A plurality of elongated apertures or slots 226, preferably three to six in number, are formed in the body 220 at substantially equally spaced apart circumferential areas. The slots 226 extend in a direction generally parallel to the axis A.

Internally, the body 220 is provided with an inwardly facing annular groove 227 in which is positioned an O-ring seal 228. A valve seat 234 is positioned axially between the first end 221 and the annular groove 227.

Encircling the body 220 and axially moveable relative thereto is an outer sleeve 230. The outer sleeve 230 has a plurality of apertures 231 equal in number to the number of slots 226 and positioned circumferentially such that each of the apertures 231 is aligned with one of the slots 226. Each of the apertures 231 has a pin 235 frictionally or otherwise permanently retained therein. Each pin 231 extends radially inwardly from the outer sleeve 230 and through the aligned slot 226 to an end which is radially inwardly of the inner surface of the body 220.

Positioned within the body 220 is a poppet 250 which extends axially from a first sealing end 251 to a second open end 252. The portion of the poppet 250 in the vicinity of the first end 251 is provided with a retention groove 253 in which is positioned an annular seal 254 which is positioned for sealing engagement with valve seat 234 when the poppet 250 is in the closed position shown in FIG. 7. Although the poppet 250 could have a variety of configurations, including a configuration similar to that shown in FIGS. 1 through 4, poppet 251 as shown in FIGS. 7 and 8 is provided with an axial passageway 257 and a plurality of angled passageways 259 disposed circumferentially around the poppet 251 in an axial position between the annular seal 254 and the O-ring 228 of the body 220. The exterior surface of the poppet 250 in the area of the O-ring 228 is sized such that the O-ring 228 is in sealing engagement therewith. That portion of the poppet 250 between the annular seal 254 and the first end 251 is closed. As a result, when the annular seal 253 is sealingly engaged to the valve seat 234, the valve assembly 250 is closed to the flow of fluid.

Externally, the poppet 250 is provided with a series of recesses 260 equal in number to and circumferentially positioned to receive therein the ends of the pins 235.

Positioned axially between the recesses 260 and the second end 252 is a radially outwardly extending shoulder 262. An outwardly facing cylindrical wall 263 is positioned between the radial shoulder 262 and the second end 252.

A threaded connector 270 is engaged to the threads 225 of the body. The threaded connector has a forward end flange 264 and an annular groove in which is positioned an O-ring 272. The interior surface of the connector 270 and the O-ring 272 are sized to provide sealing engagement between the O-ring 272 and the outwardly facing cylindrical wall 263 of the poppet 250. A compression spring 265 is positioned in space between the flange 264 and the radial shoulder 262 of the poppet 250.

An internally threaded nut 275 is engaged to the outwardly extending threads 224 of the body 220. When it is desired to open the valve assembly 210, the nut 275 is rotated on the threads 224 to move the nut toward the second end 222 of the body 220. The leading end of the nut 275 will push against the end of the outer sleeve 230 moving it axially toward the second end 222 of the body 220. Such axial movement of the outer sleeve 230 will move its pins 231 in the slots 226 of the body 220 and will carry with them the poppet 250 by virtue of the pins 235 extending into the recesses 260 of the poppet 250. Such movement will move the poppet 250 from the sealed position of FIG. 7 to the open position of FIG. 8, at which position, the annular seal 254 is spaced from the valve seat 234 thereby permitting fluid to flow into the open end 221 of the body 220, through the space between the annular seal 254 and the valve seat 234, through the tapered passageways 259 and out of the axial passageway 257.

Upon rotation of the nut 275 in the opposite direction, the outer sleeve 230 will be urged toward the first end 221 of the body 220 by the urging action of the compression spring 265 which will urge the poppet 250 to a closed position at which the annular seal 254 is sealingly engaged with the valve seat 234.

Other modifications will become readily apparent to those skilled in the art. Accordingly, the scope of the present invention should be determined only by the scope of the claims.

We claim:

1. A valve assembly comprising
   (a) a body (20) extending along an axis from a first end (21) to a second end (22), said body (20) having a passageway defined by inwardly facing wall sections, a shoulder (35) in the vicinity of said first end (21) extending inwardly from one of said inwardly facing wall sections (36);
   (b) a poppet (50) contained within said body and slideably moveable axially in said passageway, said poppet (50) extending from a first closed end (51) to a second open end (52) and having an annular seal (54) in the vicinity of said first closed end (51) engageable with said shoulder (35) and, when so engaged, cooperating with said closed end (51) to block the flow of fluid between said body first end (21) and second end (22), and at least one opening (57, 59) positioned between said annular seal (54) and said second open end (22), said opening (57, 59) permitting the flow of fluid through said body first end (21) to said body second end (22) when said annular seal (54) is spaced from said shoulder (35);
   (c) a spring yieldingly urging said poppet (50) toward said body shoulder (35); and
   (d) an actuator (80) encircling a portion of said body (20) and rotatable relative thereto, rotation of said actuator (80) on said body (20) causing axial movement of said poppet (50) within said body (20) to move said annular seal (54) from a position engaged to said shoulder (35) to a position spaced from said shoulder (35).

2. The valve assembly according to claim 1 further including one or more camming elements extending through said body, rotation of said actuator imparting to said camming elements movement inwardly toward said axis.

3. The valve assembly according to claim 2 wherein said actuator includes a (i) threaded nut threadedly engaged to said body and (ii) an axially moveable sleeve having a camming surface slidingly engaged to camming elements.

4. The valve assembly according to claim 1 wherein said body has threads in the vicinity of said first end and said actuator is engaged to said threads, rotation of said actuator resulting in axial movement of said actuator on said body.

5. The valve assembly according to claim 4 wherein said body has a plurality of slots in diverse circumferential positions and further including a sleeve encircling said body, a plurality of pins engaged to said sleeve and said poppet and extending through said slots, said actuator engaged to said sleeve.

6. A valve assembly comprising
   (a) a body (20) extending along an axis from a first end (21) to a second end (22), said body (20) having a passageway defined by inwardly facing wall sections, a shoulder (35) in the vicinity of said first end (21) extending inwardly from one of said inwardly facing wall sections (36);
   (b) a poppet (50) positioned in and axially moveable in said passageway, said poppet (50) extending from a first closed end (51) to a second open end (52) and having an annular seal (54) in the vicinity of said first closed end (51) engageable with said shoulder (35) and, when so engaged, cooperating with said closed end (51) to block the flow of fluid between said body first end (21) and second end (22), and at least one opening (57, 59) positioned between said annular seal (54) and said second open end (22), said opening (57, 59) permitting the flow of fluid through said body first end (21) to said body second end (22) when said annular seal (54) is spaced from said shoulder (35);
   (c) a spring yieldingly urging said poppet (50) toward said body shoulder (35);
   (d) an actuator (80) encircling a portion of said body (20) and rotatable relative thereto, rotation of said actuator (80) on said body (20) causing axial movement of said poppet (50) in said body (20) to move said annular seal (54) from a position engaged to said shoulder (35) to a position spaced from said shoulder (35);
   (e) one or more camming elements (71) extending through said body, rotation of said actuator imparting to said camming elements (71) movement inwardly toward said axis; and
   (f) a thrust washer (72) encircling said poppet (50) in fixed axial position relative thereto positioned in and axially moveable in said body (20), said thrust washer (72) having a camming surface (76) engaged to said camming elements (71).

7. The valve assembly according to claim 6 further including a first diaphragm sealingly engaged to said poppet and to said body, said first diaphragm being positioned axially between said sealing abutment and said thrust washer.

8. The valve assembly according to claim 7 further including a second diaphragm sealingly engaged to said poppet and to said body, said second diaphragm being positioned axially between said thrust washer and said second end.

9. A valve assembly comprising
   (a) a body (20) extending along an axis from a first end (21) to a second end (22), said body (20) having a passageway defined by inwardly facing wall sections, a shoulder (35) in the vicinity of said first end (21) extending inwardly from one of said inwardly facing wall sections (36);
   (b) a poppet (50) positioned in and axially moveable in said passageway, said poppet (50) extending from a first closed end (51) to a second open end (52) and having an annular seal (54) in the vicinity of said first closed end (51) engageable with said shoulder (35) and, when so engaged, cooperating with said closed end (51) to block the flow of fluid between said body first end (21) and second end (22), and at least one opening (57, 59) positioned between said annular seal (54) and said second open end (22), said opening (57, 59) permitting the flow of fluid through said body first end (21) to said body second end (22) when said annular seal (54) is spaced from said shoulder (35);

(c) a spring yieldingly urging said poppet (50) toward said body shoulder (35);

(d) an actuator (80) encircling a portion of said body (20) and rotatable relative thereto, rotation of said actuator (80) on said body (20) causing axial movement of said poppet (50) in said body (20) to move said annular seal (54) from a position engaged to said shoulder (35) to a position spaced from said shoulder (35);

(e) a plurality of camming elements (71) extending through said body (20), each said camming element (71) moveable from an outer position to an inner position closer to said axis; and (f) a thrust washer (72) encircling said poppet (50) in a fixed axial position relative thereto positioned in and axially moveable in said body (20), said thrust washer (72) having a camming surface (76) engaged to said camming elements (71), movement of said camming elements (71) inwardly toward said axis against said camming surface (76) moving said thrust washer (72) and said poppet (50) axially, rotation of said actuator forcing said camming elements (71) inwardly toward said axis.

10. The valve assembly according to claim 9 wherein said actuator is maintained in a fixed axial position relative to said body and has contoured inner surface portions each engaged to one of said camming elements, each said contoured inner surface portion including an outer segment and an inner segment positioned closer to said axis than said outer segment.

11. The valve assembly according to claim 10 further including a detent in at least one of said outer segments, said detent extending further from said axis than adjacent portions of said outer segment.

12. A valve assembly comprising (a) a body (20) extending along an axis from a first end (21) to a second end (22), said body (20) having a passageway defined by inwardly facing wall sections, a shoulder (35) in the vicinity of said first end (21) extending inwardly from one of said inwardly facing wall sections (36);

(b) a poppet (50) positioned in and axially moveable in said passageway, said poppet (50) extending from a first closed end (51) to a second open end (52) and having an annular seal (54) in the vicinity of said first closed end (51) engageable with said shoulder (35) and, when so engaged, cooperating with said closed end (51) to block the flow of fluid between said body first end (21) and second end (22), and at least one opening (57, 59) positioned between said annular seal (54) and said second open end (22), said opening (57, 59) permitting the flow of fluid through said body first end (21) to said body second end (22) when said annular seal (54) is spaced from said shoulder (35);

(c) a spring yieldingly urging said poppet (50) toward said body shoulder (35);

(d) an actuator (80) encircling a portion of said body (20) and rotatable relative thereto, rotation of said actuator (80) on said body (20) causing axial movement of said poppet (50) in said body (20) to move said annular seal (54) from a position engaged to said shoulder (35) to a position spaced from said shoulder (35);

(e) threads in the vicinity of said body first end, said actuator being engaged to said threads, rotation of said actuator resulting in axial movement of said actuator on said body;

(f) a plurality of balls extending through said body, rotation of said actuator imparting to said balls movement inwardly toward said axis; and (g) a thrust washer encircling said poppet in fixed axial position relative thereto positioned in and axially moveable in said body, said thrust washer having a camming surface engaged to said balls, movement of said balls inwardly toward said axis against said camming surface moving said thrust washer and said poppet axially.

13. A valve assembly comprising (a) a body extending along an axis from a first end to a second end, said body including a passageway, a sealing abutment in the vicinity of said first end, an enlargement having a recess with an open end encircling said axis and facing toward one of said body first or second ends and one or more apertures extending between said recess and said passageway;

(b) a poppet having a sealing end and an open end positioned in said body passageway for movement axially therein, said poppet having an annular seal in the vicinity of said sealing end engageable with said sealing abutment and one or more passageways between said annular seal and said open end;

(c) one or more moveable camming members positioned in said apertures;

(d) an actuator rotatably positioned in said recess, said actuator having an interior surface slidably engaged with said camming members, said interior surface being contoured with one or more first sections and second sections adjacent thereto, said first sections being closer to said axis than said second sections;

(e) a thrust washer positioned in said body passageway for movement axially therein, said thrust washer affixed to said poppet to impart axial movement thereto upon axial movement of said thrust washer; rotation of said actuator from a position at which said second sections are engaged to said camming members to a position at which said first sections are engaged to said camming members moving said poppet from a position at which said annular seal is engaged to said body sealing abutment to a position at which said annular seal is spaced from said body sealing abutment.

14. The valve assembly according to claim 13 wherein said actuator has a detent in at least one of said second sections, said detent extending further from said axis than adjacent portions of said second sections.

15. The valve assembly according to claim 13 further including a resilient member yieldingly urging said poppet to a position at which said annular seal is sealingly engaged to said sealing abutment when said actuator interior surface second sections are engaged to said camming members.

16. The valve assembly according to claim 13 wherein said camming members are balls and said thrust washer has a camming surface tapering inwardly toward said axis in a direction toward said first end.

17. The valve assembly according to claim 13 further including a first diaphragm sealingly engaged to said poppet and to said body, said first diaphragm being positioned axially between said sealing abutment and said thrust washer.

18. The valve assembly according to claim 17 further including a second diaphragm sealingly engaged to said poppet and to said body, said second diaphragm being positioned axially between said thrust washer and said second end.

19. A method for controlling the flow of fluid comprising the steps of
  (a) providing a valve assembly having
    (i) a body (20) extending along an axis from a first end (21) to a second end (22), said body (20) having a passageway defined by inwardly facing wall sections (34, 36, 42), a sealing abutment (35) in the vicinity of said first end (21) extending inwardly from one of said inwardly facing wall sections (36);
    (ii) a poppet (50) positioned in and axially moveable in said passageway, said poppet (50) extending from a first closed end (51) to a second open end (52) and having an annular seal (54) in the vicinity of said first closed end (51) engageable with said shoulder (35) and, when so engaged, cooperating with said closed end (51) to block the flow of fluid between said body first (21) and second end (22), and at least one opening (57, 59) positioned between said annular seal (54) and said second open end (22), said opening (57, 59) permitting the flow of fluid through said body first end (21) to said body second end (22) when said annular seal (54) is spaced from said shoulder (35);
    (iii) one or more camming elements (71) extending through said body (20);
    (iv) a spring yieldingly urging said poppet (50) toward said body sealing abutment (35); and
    (v) an actuator (80) encircling a portion of said body (20) and rotatable relative thereto, said actuator having a surface (84) engaged to said camming elements (71), said surface (84) having first and second portions (84A, 84B & 84C), said first portion being closer to said axis that said second portions; and
  (b) rotating said actuator (80) from a position at which said second portions are engaged to said camming elements (71) to a position at which said first portions (84A, 84B & 84C) are engaged to said camming elements (71) to thereby urge said camming elements (71) inwardly, said camming elements (71) imparting axial movement to said poppet (50) within said body (20) to move said annular seal (54) out of contact with said sealing abutment (35).

* * * * *

UNITED STATES PATENT AND TRADEMARK OFFICE
CERTIFICATE OF CORRECTION

PATENT NO. : 6,244,566 B1
DATED : June 12, 2001
INVENTOR(S) : Richard M. France & Russell L. Rogers It is certified that error appears in the above-identified patent and that said Letters Patent is hereby corrected as shown below:

<u>Title page,</u>
Under (*) Notice section, please delete -- This patent issued on a continuation prosecution application filed under 37 CFR 1.53(d), and is subject to the twenty year patent term provisions of 35 U.S.C. 154(a) (2). --

Signed and Sealed this

Twenty-ninth Day of January, 2002

Attest:

JAMES E. ROGAN
*Attesting Officer*  *Director of the United States Patent and Trademark Office*